United States Patent
Kamphues et al.

[15] 3,667,622
[45] June 6, 1972

[54] METHOD OF AND MEANS FOR STACKING MOULDED ARTICLES IN GROUPS

[72] Inventors: Hermann Kamphues, Rheine; Hans-Jurgen Rosengarten, Georgsmarienhutte, both of Germany

[73] Assignee: C. Keller & Co., Laggenbeck, Germany

[22] Filed: Jan. 5, 1971

[21] Appl. No.: 104,035

[30] Foreign Application Priority Data

Aug. 17, 1970 Germany ..................... P 20 40 813.3

[52] U.S. Cl. .............................. 214/6 A, 198/34 R, 198/35, 214/1 Q, 214/152, 294/63
[51] Int. Cl. .......................................................... B65g 57/26
[58] Field of Search ....................... 214/6 A, 6, 6 FS, 6 F, 6.5, 214/1 Q, 152; 198/34 R, 35

[56] References Cited

UNITED STATES PATENTS

| | | | |
|---|---|---|---|
| 3,480,161 | 11/1969 | Bason | 214/6 A |
| 3,487,954 | 1/1970 | Pearne et al. | 214/6 A |
| 3,589,495 | 6/1971 | Pearne | 214/6 A |

FOREIGN PATENTS OR APPLICATIONS

| | | | |
|---|---|---|---|
| 1,015,171 | 12/1965 | Great Britain | 214/6 A |

*Primary Examiner*—Robert J. Spar
*Attorney*—H. Geoffrey Lynfeld

[57] ABSTRACT

Moulded articles such as bricks are arranged in a plurality of aligned rows side by side on a conveyor belt. The rows are transferred to a second belt and have their spacing adjusted. The articles are then seized in a group and lifted off the belt, turned through 180° and deposited on a next group of articles to form a two-tier set-up. This is then transferred by a gripping device to a firing carriage.

5 Claims, 4 Drawing Figures

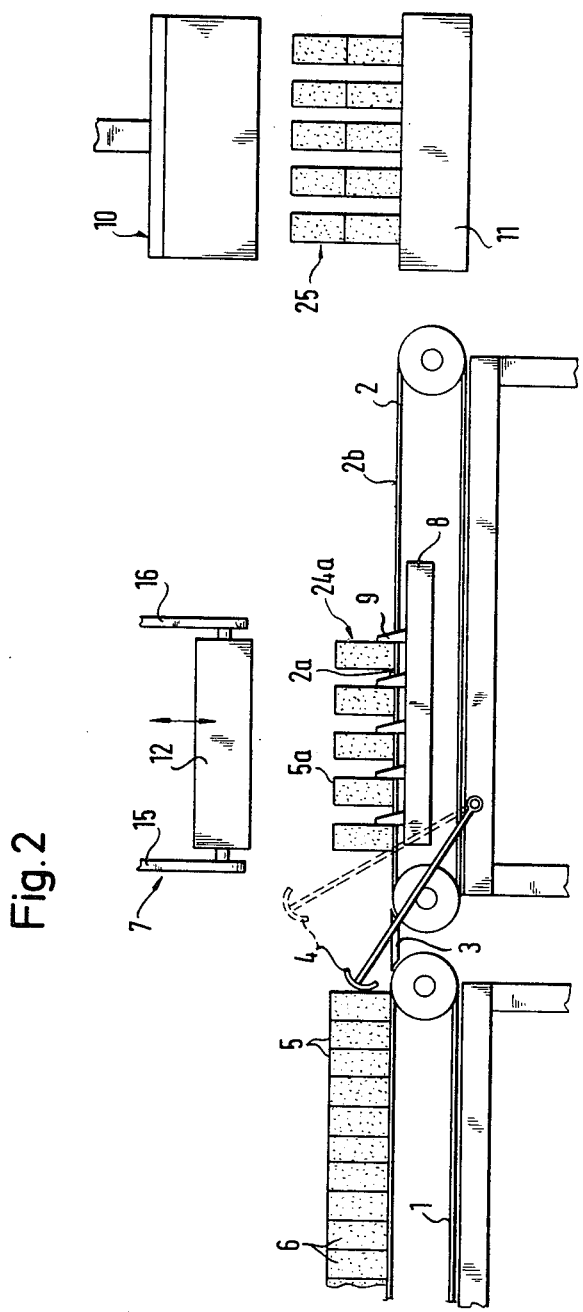

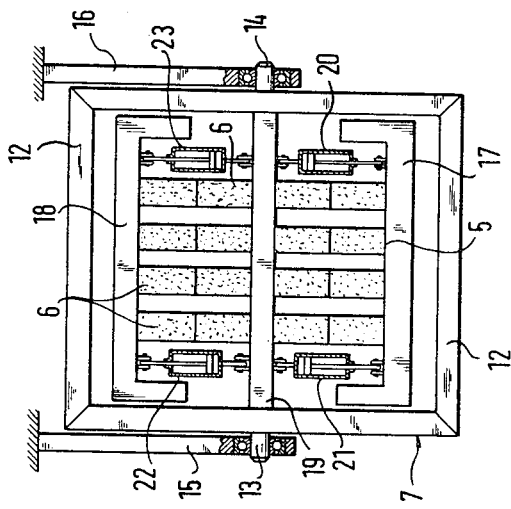
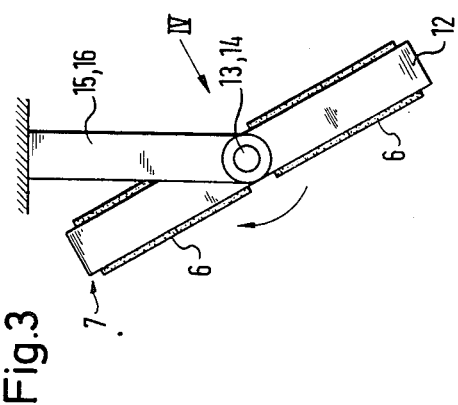
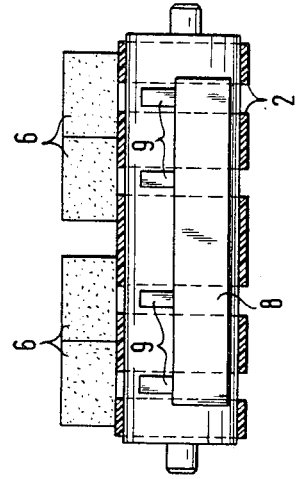

METHOD OF AND MEANS FOR STACKING MOULDED ARTICLES IN GROUPS

This invention relates to a method of and means for stacking molded articles such as bricks and transferring stacked groups of such articles to a firing carriage.

It is known in the art to arrange molded articles such as bricks or tiles in spaced groups, to turn these groups through 180° and to place such turned group onto a next group of molded articles. In this way it is achieved that the molded articles are arranged in pairs on a firing carriage, the individual articles lying face to face with their display surfaces so that these surfaces are protected against discoloration during firing and also prevented from being deformed. The known arrangements for forming these piles by machine have a low output as it is possible only to arrange a single row of spaced articles and to place these one at a time onto the next succeeding row. Also it has been found that the re-grouping of molded members thus arranged in two-tiers causes the alignment of the molded articles to be disturbed on the conveyor belts which are caused to move at varying speeds. It has been found that these molded articles before they reach the end of the run of the belt have rotated or slipped or have even turned over and are no longer in alignment.

It is the object of the invention to overcome these drawbacks and to convey groups of two-tier sets of molded articles to a firing carriage without subjecting the individual articles to undue stress and upset their respective alignment.

According to the invention we provide means for stacking molded articles in groups on a firing carriage, comprising a first conveyor belt adapted to receive a plurality of rows of molded articles arranged side by side, means for intermittently moving the leading group of articles onto a second conveyor band in horizontal alignment with the first belt, a grouping ledge for adjusting the relative spacing of the articles on the second belt, a turn gripper for seizing the group of spaced articles, raising these articles off the conveyor belt, turning them through 180°, and lowering them onto the next group of spaced articles to form a two-tier set-up and a gripping device for grasping the two-tier set-up and depositing it on a firing carriage.

In a further feature of the invention a grouping ledge is arranged below the second conveyor band and adjustment fingers on said grouping ledge are adapted to project through the conveyor belt and adjust the spacing of the molded articles on said second belt.

The turn gripper comprises a rectangular frame, an axle centrally mounted on said frame, and projecting with its ends beyond said frame, supports holding the ends of said axle, gripping jaws slidably mounted on the inside of said frame, and hydraulic means on said frame for opening and closing said gripping jaws.

The turn gripper has also movable intermediate tongues adapted to be pressed against the sides of the molded articles.

We further provide a method of stacking molded articles in groups on a firing carriage, comprising the steps of placing the articles in a plurality of rows arranged side by side on an intermittently driven first conveyor belt, transversely lining up the rows of articles, conveying a line of articles onto a continuously driven second belt in horizontal alignment with the first belt, the articles thus forming a spaced grouping on the second belt, adjusting the relative spacing of the articles on the second belt by means of adjustment fingers, seizing the group of spaced articles, raising the articles off the conveyor belt and turning them through 180° while a next group of spaced articles is lined up on the second belt, lowering the first group onto the next group and thus forming a two-tier set-up and transferring this two-tier set-up onto a firing carriage by means of another gripping device.

Further details of the invention will be clear from the following description having reference to the accompanying drawings showing by way of example diagrammatically a constructional embodiment of an arrangement for stacking molded articles.

In the drawings:

FIG. 2 shows a similar view of the placement means in a different operating position;

FIG. 3 is a section taken along the line III—III in FIG. 1 and shows the turn gripper during its turning movement; and FIG. 4 is a plan view of the turn gripper shown in FIG. 3.

Figure 1:
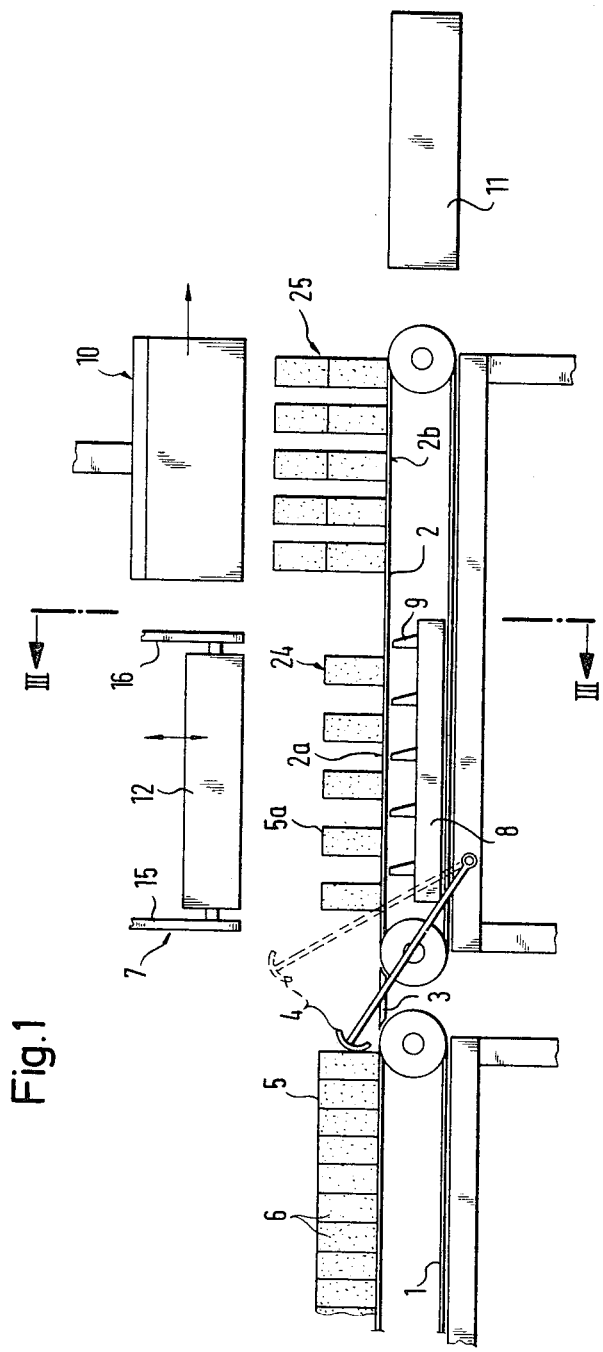
FIG. 1 is a side view of an arrangement for placing the molded articles and an adjoining firing carriage.

The placement means comprises a first conveyor belt 1 and a second re-grouping conveyor belt 2 which forms a continuation of the first belt and is arranged at the same height and acts for arranging the molded articles in groups. Between these two conveyor belts is arranged a transfer tongue 3, above which is arranged a pivotal abutment member 4 which transversely lines up the rows 5 of the molded articles 6 which are arranged side by side in longitudinal rows on the first belt, the width of the rows corresponding to that of the pile to be fired.

Above the portion 2a of the second conveyor belt 2 which is next to the first conveyor belt 1, a turn gripper 7 is arranged which is movable in a vertical direction. Below this portion 2a of the conveyor belt 2, a grouping ledge 8 is provided which is movable in a vertical direction. Ajdustment fingers 9 on this ledge are adapted to project through the conveyor belt 2 which is made in sections. This ledge, in its uppermost operating position, is shown in FIG. 2. The adjustment fingers 9 are movably located on the grouping ledge 8 and are capable of adjustment in relation to each other so that their spacing can be changed.

A gripping device 10 is arranged above the other end 2b of the conveyor belt 2. This gripping device is adapted to convey the groups of molded articles away from the range of the turn gripper 7 and stack up molded articles on a firing carriage 11 in cross-wise relationship.

The turn gripper 7 consists of a rectangular frame 12 which is turnably suspended in supports 15, 16 with the projecting ends of an axle 13 arranged centrally with respect to the frame. The frame is also provided with gripping jaws 17, 18 which are adapted to slide towards each other on the inside of the frame under the action of hydraulic cylinders 20,21,22 and 23 which are carried on a transverse member 19 of frame 12. In this way the gripping jaws can be opened and closed.

In order to grip a group of molded articles 6 aligned on the conveyor belt, the turn gripper may be provided with movable intermediate tongues held in guides of the frame 12 but which have been omitted from the drawing. These tongues are pressed against the sides of the molded articles when the gripping jaws are closed and are seized thereby.

The placement means shown in the drawing operate in the following manner: The molded articles 6 are placed by gripping means (not shown) in longitudinal rows on the first conveyor belt 1, the width of these rows corresponding to that of the pile to be fired. On movement of the conveyor belt the longitudinal rows reach the abutment member 4 which ensures the transverse alignment of rows 5 of the molded articles on the first conveyor belt 1.

When the longitudinal rows have reached the abutment member 4, the conveyor belt 1 is stopped and the abutment member 4 is turned upwardly into the position shown in broken lines thus freeing the leading transverse row 5 of the group of articles on the conveyor belt 1. The first and second conveyor belts 1 and 2 are now driven at the same speed so that one transverse row 5 at a time is moved over onto the second conveyor belt 2. After the transfer of this first transverse row 5 onto the second conveyor band 2 has been completed, the drive of the first conveyor belt 1 is stopped until the next following transverse row can be moved over to the second conveyor belt 2 at the desired distance from the first transverse row. This process is repeated until the desired number of transverse rows has been transferred to the second conveyor belt as indicated by grouping 24 shown in FIG. 1. It will be understood that such a grouping of the molded articles on the second conveyor belt may also be achieved in some other convenient way.

The grouping 24 is arranged on the second conveyor belt 2 immediately below the turn gripper 7. When this position has been reached, the adjustment ledge 8 is raised and the adjustment fingers 9 project through the upper run of the sectional conveyor belt 2. The adjustment fingers 9 are then moved to pre-determined distances and so contact the transverse rows 5a of the molded articles 6 in such a manner that these transverse rows are spaced in exact predetermined positions. This adjustment is shown in grouping 24a shown in FIG. 2.

The turn gripper 7 is now lowered. In the lowered position the gripping jaws 17, 18 seize the molded articles 6 in grouping 24a at their narrower outer surfaces and force the molded articles against the intermediate tongue 19. The turn gripper 7 is the lifted so that the grouping 24a of articles is moved out of reach of the adjustment fingers 9. The frame 12 is then turned with the suspended grouping through 180° and the sides of the molded articles which were previously uppermost are now facing downwardly.

In the meantime, after lowering of the grouping ledge 8, a new grouping 24 has been placed in position on the second conveyor belt 2 and adjusted to form a new grouping 24a. The first grouping of articles which is still being held by the turn gripper 7 and which has been turned through 180° is now placed on the next properly adjusted grouping 24a by lowering the turn gripper so that a two-tier set-up as shown at 25 to the right of FIG. 1 is formed.

The two-tier set-up is now conveyed to the right away from the turn gripper and comes below the gripping device 10 which seizes the two-tier set-up 25 and transfers it to the firing carriage 11. On conveying further two-tier set-ups, these can be readily piled up cross-wise on the firing carriage 11.

WHAT WE CLAIM IS

1. Means for stacking molded articles in groups on a firing carriage, comprising a first conveyor belt adapted to receive a plurality of rows of molded articles arranged side by side, means for intermittently moving the leading group of articles onto a second conveyor band in horizontal alignment with the first belt, a grouping ledge for adjusting the relative spacing of the articles on the second belt, a turn gripper for seizing the group of spaced articles, raising these articles off the conveyor belt turning them through 180°, and lowering them onto the next group of spaced articles to form a two-tier set-up and a gripping device for grasping the two-tier set-up and depositing it on a firing carriage.

2. Means as claimed in claim 1 wherein a grouping ledge is arranged below the second conveyor band and adjustment fingers on said grouping ledge are adapted to project through the conveyor belt and adjust the spacing of the molded articles on said second belt.

3. Means as claimed in claim 1 wherein the turn gripper comprises a rectangular frame, an axle centrally mounted on said frame, and projecting with its ends beyond said frame, supports holding the ends of said axle, gripping jaws slidably mounted on the inside of said frame, and hydraulic means on said frame for opening and closing said gripping jaws.

4. Means as claimed in claim 3 wherein the turn gripper has movable intermediate tongues adapted to be pressed against the sides of the molded articles.

5. Method of stacking molded articles in groups on a firing carriage, comprising the steps of placing the articles on a plurality of rows arranged side by side on an intermittently driven first conveyor belt, transversely lining up the rows of articles, conveying a line of articles onto a continuously driven second belt in horizontal alignment with the first belt, the articles thus forming a spaced grouping on the second belt, adjusting the relative spacing of the articles on the second belt by means of adjustment fingers, seizing the group of spaced articles, raising the articles off the conveyor belt and turning them through 180° while a next group of spaced articles is lined up on the second belt, lowering the first group onto the next group and thus forming a two-tier set-up and transferring this two-tier set-up onto a firing carriage by means of another gripping device.

* * * * *